United States Patent
Ferrant et al.

(10) Patent No.: US 8,266,494 B2
(45) Date of Patent: Sep. 11, 2012

(54) BUS WITH ERROR CORRECTION CIRCUITRY

(75) Inventors: Richard Ferrant, Esquibien (FR); Cédric Maufront, Saint Martin d'Heres (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 1121 days.

(21) Appl. No.: 12/140,643

(22) Filed: Jun. 17, 2008

(65) Prior Publication Data

US 2009/0125789 A1 May 14, 2009

(30) Foreign Application Priority Data

Jun. 20, 2007 (FR) ...................................... 07 55898

(51) Int. Cl.
*H03M 13/00* (2006.01)

(52) U.S. Cl. .......................... 714/752; 714/786; 714/799

(58) Field of Classification Search .................. 714/752, 714/786

See application file for complete search history.

(56) References Cited

U.S. PATENT DOCUMENTS

| | | | |
|---|---|---|---|
| 5,274,646 A * | 12/1993 | Brey et al. ...................... 714/758 |
| 5,490,155 A * | 2/1996 | Abdoo et al. .................. 714/763 |
| 6,901,486 B2 * | 5/2005 | Handgen et al. ............... 711/137 |
| 7,058,735 B2 * | 6/2006 | Spencer .......................... 710/24 |
| 7,243,203 B2 * | 7/2007 | Scheuerlein ................... 711/169 |
| 7,269,681 B1 * | 9/2007 | Hypher et al. ................. 710/314 |
| 7,321,997 B2 * | 1/2008 | Zimmerman et al. ........ 714/718 |
| 7,409,581 B2 * | 8/2008 | Santeler et al. ................ 714/6.1 |
| 2002/0046366 A1 | 4/2002 | Ono |
| 2002/0156953 A1 * | 10/2002 | Beiley et al. .................. 710/105 |
| 2002/0188892 A1 | 12/2002 | Lajolo |
| 2004/0037367 A1 | 2/2004 | Werner |
| 2004/0153939 A1 | 8/2004 | Aoyama et al. |

OTHER PUBLICATIONS

French Search Report from corresponding French Application No. 07/55898, filed Jun. 20, 2007, Search completed Mar. 31, 2008.

* cited by examiner

*Primary Examiner* — Esaw Abraham (74) *Attorney, Agent, or Firm* — Wolf, Greenfield & Sacks, P.C.

(57) ABSTRACT

A data bus including a plurality of logic blocks coupled in series, each logic block including at least one buffer for buffering at least one data bit transmitted via the data bus and at least one of the logic blocks further including circuitry coupled in parallel with the at least one buffer and arranged to determine a first bit of error correction code associated with the at least one data bit.

10 Claims, 5 Drawing Sheets

BUS WITH ERROR CORRECTION CIRCUITRY

BACKGROUND OF THE INVENTION

1. Field of the Invention

The present invention relates to error correction circuitry and in particular to a bus comprising error correction circuitry.

2. Discussion of the Related Art

Any processing of data, including storing data or transmitting data electronically, can result in errors, and subsequent problems in regenerating the data. Error correction codes provide a means of determining when errors occur in data, and/or correcting these errors. Hamming code is an example of such an error correction code, and is based on a polarity check of various combinations of bits of a word, each combination providing one bit of error correction data.

Another example of an error correction code is described in US patent application publication US2003/0070135 developed by Laurent Murillo, which has advantages over the Hamming code in terms of usability, and generally requires one extra bit of error correction code when compared to the Hamming code.

In general, the use of error correcting codes adds a delay to the reading of data from a memory or the reception of transmitted data, which is a disadvantage.

Figure 1:
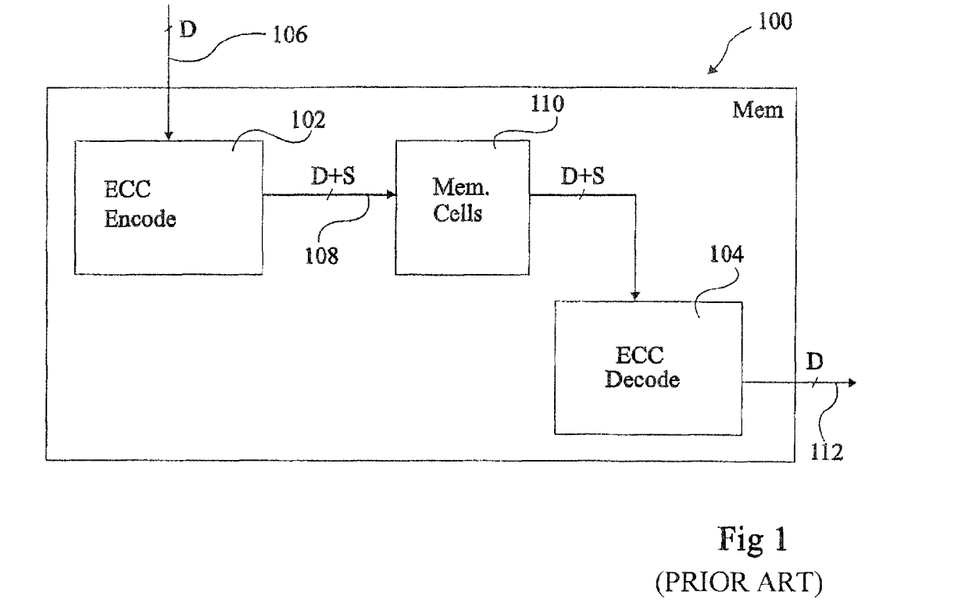
FIG. 1 schematically illustrates conventional art including a memory comprising error correction code circuitry.

FIG. 1 illustrates an example of a memory 100 comprising error correction code (ECC) encode block 102 and ECC decode block 104, which generate and check error coding, respectively. Thus, when writing to memory 100, data D is provided at an input 106 to the ECC encode block 102, which generates error correction bits, for example using the Hamming code mentioned above. The data D and error correction bits S are output by the ECC encode block 102 at an output 108 and are then stored in the memory cells 110 of the memory 100. When the data D is read from the memory, it is provided with associated correction bits S to the ECC decode block 104, which regenerates the error correction bits using the data from the memory cells 110, and checks that the regenerated error correction bits are the same as the stored bits S. One or more errors may be corrected by comparing the regenerated and stored error correction bits. This comparison can directly indicate the location of errors, which can be corrected by inverting the corresponding bit. The data D is then output from the ECC decode block and memory at an output 112.

In the example of FIG. 1, there is a delay in generating the error correction coding bits by block 102, and then a further delay when reading data from a memory caused by the error correction decoding block 104.

Figure 2:
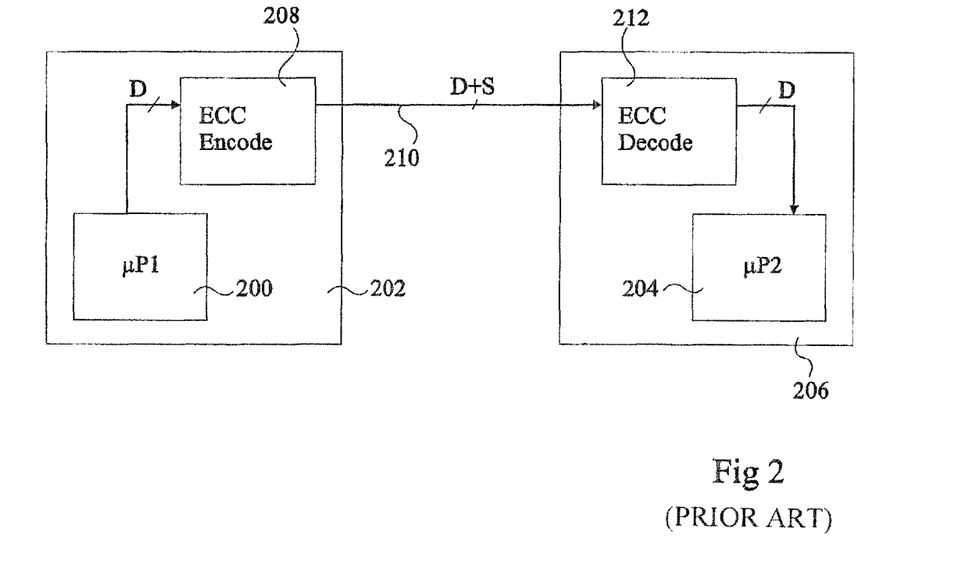
FIG. 2 schematically illustrates conventional art including two integrated circuits each comprising error correction code circuitry.

FIG. 2 illustrates an alternative example in which a microprocessor 200 on an integrated circuit (IC) 202 transmits data D to a microprocessor 204 which is part of a second IC 206. Error correction code is generated by an ECC encode block 208 on IC 202, and the data D and associated error correction code S is transmitted via a transmission line 210 to IC 206. At IC 206, an ECC decode block 212 checks the error correction code by regenerating an error correction code based on the data received via line 210, and verifies that it is the same as the code transmitted on bus 210. Again, depending on the encoding scheme used, one or more errors in the data can be detected and/or corrected. The data is then provided to microprocessor 204.

The error correction coding blocks 208 and 212 of the circuitry in FIG. 2 are also disadvantageous due to the added delay they bring to the transmission and reception of data.

SUMMARY OF THE INVENTION

It is an aim of at least one embodiment of the present invention to provide error correction encoding circuitry that at least partially addresses one or more problems in the prior art.

According to one aspect of a present invention, there is provided a data bus comprising a plurality of logic blocks coupled in series, each logic block comprising at least one buffer for buffering at least one data bit transmitted via said data bus and at least one of said logic blocks further comprising circuitry coupled in parallel with said at least one buffer and arranged to determine a first bit of error correction code associated with said at least one data bit.

According to one embodiment of the present invention, the first bit of error correction code is output by said at least one logic block and transmitted with said at least one data bit via said bus. In particular, the purpose of generating error correction bits according to some embodiments of the present invention is to provide these bits to downstream error correction circuitry that is used to verify the data. While the bus itself does not, for example, introduce errors in the data transmitted via the bus, according to embodiments of the present invention, the bus is coupled to intermediate circuitry, such as a memory or transmission line that may introduce errors, and the first error correction bit is used to verify the data after the data has passed through the intermediate circuitry.

According to another embodiment of the present invention, the data bus further comprises a plurality of outputs for outputting said data and said first bit of error correction code.

According to another aspect of the present invention, there is provided a circuit comprising the above data bus and a further data bus coupled to the data bus and comprising a plurality of second logic blocks coupled in series, each second logic block comprising at least one second buffer for buffering at least one data bit transmitted via said second data bus and at least one of said second logic blocks further comprising circuitry coupled in parallel with said at least one second buffer arranged to determine a second bit of error correction code and to compare said first and second bits of error correction code.

According to an embodiment of the present invention, at least one of the second logic blocks further comprises logic for correcting the data based on the comparison.

According to an embodiment of the present invention, the circuit further comprises a memory circuit coupled between the first and second data buses, the memory circuit arranged to store the at least one data bit and the first bit of error correction code.

According to an embodiment of the present invention, the circuit further comprises a transmission line couple between the first and second data buses, the transmission line arranged to transmit the at least one data bit and the first bit of error correction code from the first to the second circuit block.

According to another aspect of the present invention, there is provided an electronic device comprising the above data bus or circuit.

According to another aspect of the present invention, there is provided a media player or a mobile telephone comprising the above electronic device.

According to another aspect of the present invention, there is provided a method of transmitting data via a data bus comprising buffering at least one bit of the data using at least one buffer of a logic block; and during a time delay provided by the at least one buffer, determining by the logic block at least one bit of error correction code associated with the at least one bit of data.

BRIEF DESCRIPTION OF THE DRAWINGS

The foregoing and other purposes, features and advantages of the invention will become apparent from the following detailed description of embodiments, given by way of illustration and not limitation with reference to the accompanying drawings, in which.

DETAILED DESCRIPTION

Figure 3:
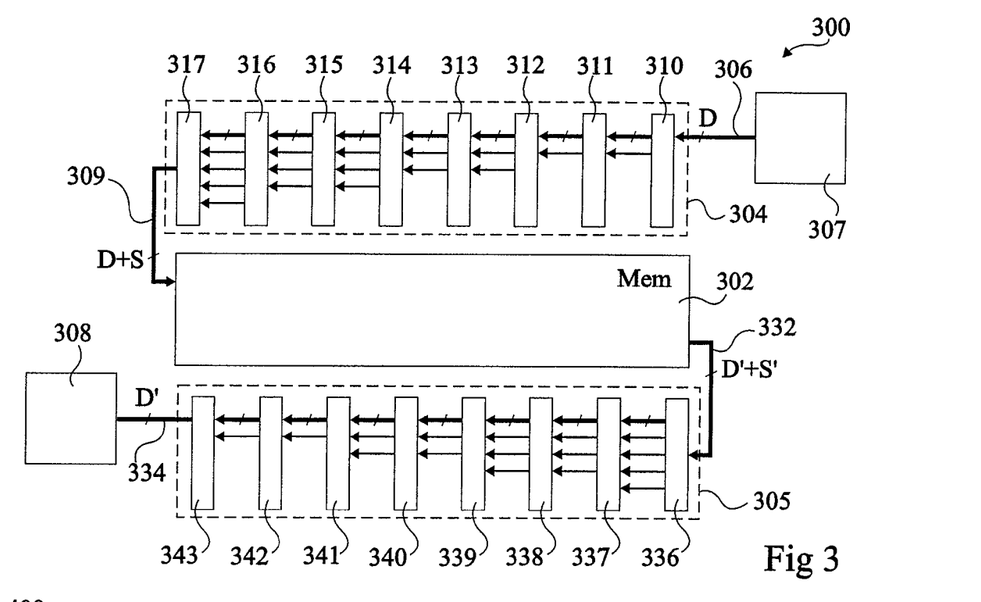
FIG. 3 illustrates a memory with associated error correction code circuitry according to an embodiment of the present invention.

FIG. 3 illustrates a memory circuit 300 comprising a memory 302, for example, static random access memory (SRAM) or read only memory (ROM), a data bus 304 coupled at an input of the memory and a data bus 305 coupled at an output of the memory. The term "data bus" is used herein to designate any connection between electronic devices for the transfer of data. In FIG. 3, a device 307 is coupled to memory 302 by data bus 304, while memory 302 is coupled to a device 308 by data bus 305. Devices 307 and 308 are, for example, ports of a microprocessor, or other circuitry that can access the memory 302.

Data bus 304 comprises input lines 306 for receiving data D, which is to be stored in the memory 302. In this example data is transmitted in parallel, and thus the number of lines 306 is, for example, equal to the number of bits of data stored in each memory cell of the memory 302, for example 16 or 32 bits. In an alternative embodiment, data bus 304 and/or data bus 305 could be serial data buses. Data bus 304 also comprises output lines 309 coupled to the memory 302 providing the data D and a number of error correction bits S. The number of data lines of the output lines 309 is equal to the number of data lines at the input 306, while the number of lines for the error correction bits S will depend on the number of bits generated, and in this example is four.

Data bus 304 also comprises eight buffer logic blocks 310 to 317, coupled in series between the input lines 306 and the output lines 309. Due to the distance separating device 307 and the memory 302, buffers are provided to amplify the data at numerous points between the input lines 306 and the memory 302, to reduce the overall delay to the signal.

By way of example, a 1 Mb SRAM fabricated using 45 nm technology can have a perimeter equal to approximately 4 mm in length, half the perimeter therefore being equal to approximately 2 mm. This distance gives a good indication of the type of distance a connection to the SRAM is needed to cover. In such technology, connections covering a distance of 2 mm can introduce a delay to signals of approximately 4 ns. This delay is determined by distributed resistors and capacitors. By contrast, if the data is buffered, for example into ten segments, by ten evenly spaced buffers, the distance is divided by ten, and therefore the resistance and capacitance of each segment is one tenth of the whole transmission line, and the delay of each segment is thus one hundredth of that of the whole transmission line. The delay between each buffer therefore falls to approximately 0.040 ns instead of 4 ns, giving a total delay of only 0.40 ns. Thus, the use of buffers is often a requirement.

At least some of the buffer logic blocks 310 to 317 (here blocks 310, 312, 314 and 316) further comprise circuitry for generating the error correction bits S based on the data bits D, such that at the output of the last buffer logic block 317, all of the error correction bits S associated with data D have been generated.

Each buffer logic block 310 to 317 also comprises one or more buffers for buffering the data signals D, and also buffers for buffering the error correction bits S, or intermediate signals in the generation of S bits, received by that buffer. For example, block 317 comprises buffers for buffering the data D and the four error correction bits S received from buffer 316, while buffer 310 comprises only buffers for data D.

Data bus 305 comprises input lines 332 which are coupled to the memory 302 for receiving data D' and error correction bits S' from the memory 302. For a given memory cell, the data D' and error correction bits S' are in principle the same as the data D and bits S provided by data bus 304, but errors may have been introduced. Output data lines 334 are provided for outputting the data D', and, as with the number of input lines 306 to data bus 304, the number of output lines 334 is for example equal to the number data bits stored in each cell of memory 302.

Data bus 305 further comprises eight buffer logic blocks 336 to 343 coupled in series between the input data lines 332 and the output data lines 334. Again, buffers are preferable due to the distance separating the memory 302 and device 308. Each block 336 to 343 comprises a buffer for buffering the data D' and the error correction bits S' provided to subsequent buffer logic blocks in the series. At least some of the buffer logic blocks 336 to 343 further comprise logic for checking the error correction bits S' with respect to new error correction bits calculated associated with data D'. Once each error correction bit has been used to check the data, it is no longer necessary for it to be transmitted to the next buffer logic block in the series, and thus in this example the number of error correction bits S', and therefore the number of connections between logic blocks, falls between first and last buffer logic blocks 336-343. At the output of the last buffer logic block 343, only the data D' on lines 334 are output.

In the case that only a check of the data D' with respect to the error correction bits S' is performed, an indication is, for example, provided from the data bus 305 if an error is found, such that action can be taken in response, such as re-reading the data in question from the memory 302. Alternatively, the circuitry in buffer logic blocks 336 to 343 not only checks the data D', but also corrects some or all errors in the data, based on a comparison between the stored error correction bits S' and the regenerated error correction bits. In this case, modified data D" is output from the last buffer 343.

Figure 4:
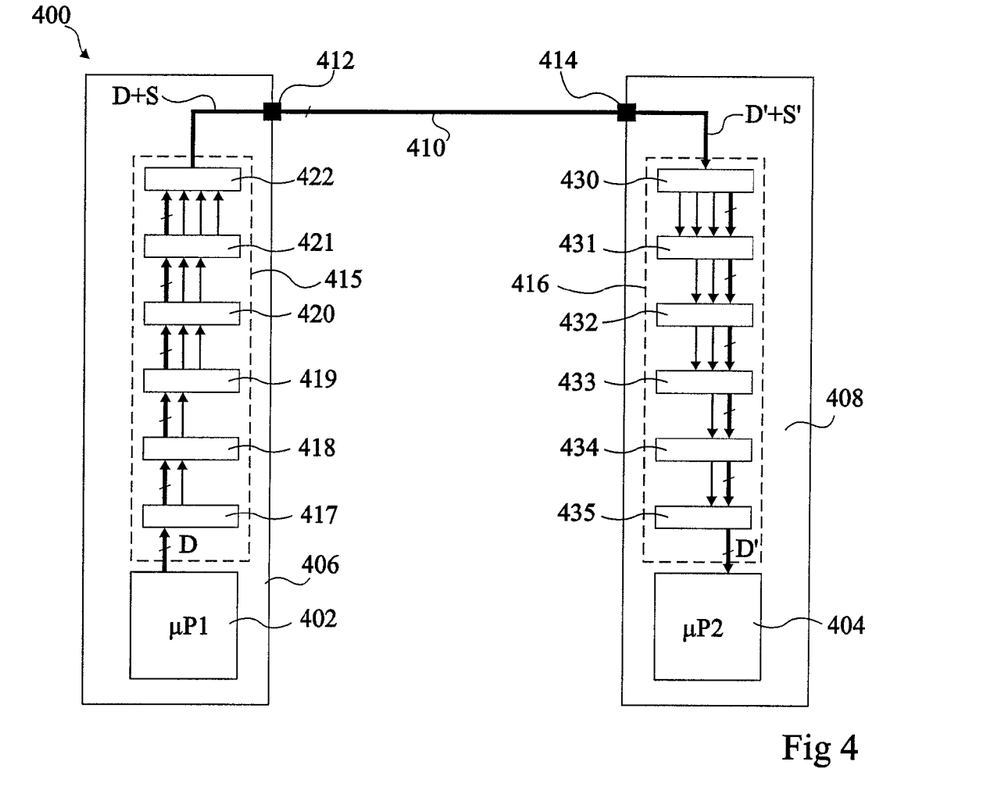
FIG. 4 illustrates first and second circuit blocks each comprising error correction circuitry according to an embodiment of a present invention.

FIG. 4 illustrates transmission circuitry 400 for transmitting data from a microprocessor 402 to a microprocessor 404, although the principle can be applied to transmission of data between any devices.

In the example of FIG. 4, microprocessor 402 is part of a circuit block 406, which is for example a first IC, and microprocessor 404 is part of a circuit block 408 which is for example a second IC, circuit blocks 406 and 408 being coupled together by a transmission line 410. Transmission line 410 is, for example, a serial connection or other type of connection that may result in errors occurring in the transmitted data. For example, if data is transmitted from a processor to a display of an electronic device, errors may occur in the data during transmission due to electromagnetic interference. To avoid and/or correct errors, error correction encoding and decoding is applied at each end of the transmission line respectively. Circuit block 406 comprises an output port 412 for outputting data D and error correction bits S on the bus 410, while circuit block 408 comprises an input port 414 for receiving the data D' and error correction bits S' from the bus 410.

The distances between the microprocessors 402, 404 and respective output and input ports 412, 414 are such that a series of buffers are preferable in both cases to buffer the data at regular points. Data buses 415 and 416 are provided each comprising buffer logic blocks. In this example, data bus 415 comprises six buffer logic blocks 417 to 422 coupled in series between microprocessor 402 and output port 412. As with the buffer logic blocks described in relation to FIG. 3, these blocks comprise buffers for buffering the data signal D and also, possibly, logic for generating error correction bits S and any intermediate signals. Data bus 416 is provided between the input port 414 and microprocessor 404, and comprises six buffer logic blocks 430 to 435 coupled in series, each of these buffer logic blocks comprising buffers for buffering the data D' and also possibly logic for checking the error correction bits S'.

Data buses 415 and 416 operate in a very similar fashion to data buses 304 and 305 discussed in FIG. 3, and this will not be described again in detail.

In some embodiments, the error correction circuitry only checks the data D' with respect to error correction bits S', and provides an indication, for example, to microprocessor 404, if errors are detected. If so, the data is, for example, retransmitted. In alternative embodiments, the circuitry of data bus 416 may additionally or alternatively correct errors in the data, in which case the output from the last buffer logic block 435 is data D", which is a corrected version of data D'.

The embodiments of FIGS. 3 and 4 advantageously make use of the fact that in modern integrated circuit design, there is a tendency towards smaller circuits comprising thinner metal tracks which have a higher resistance, and therefore need more buffering. At the same time, error correction code is often required to ensure the integrity of the data, and by incorporating the logic required for generating and checking the error correction bits within the buffer logic blocks for buffering the data signals, the error correction circuitry can be implemented that adds no delay to the system.

Figure 5:
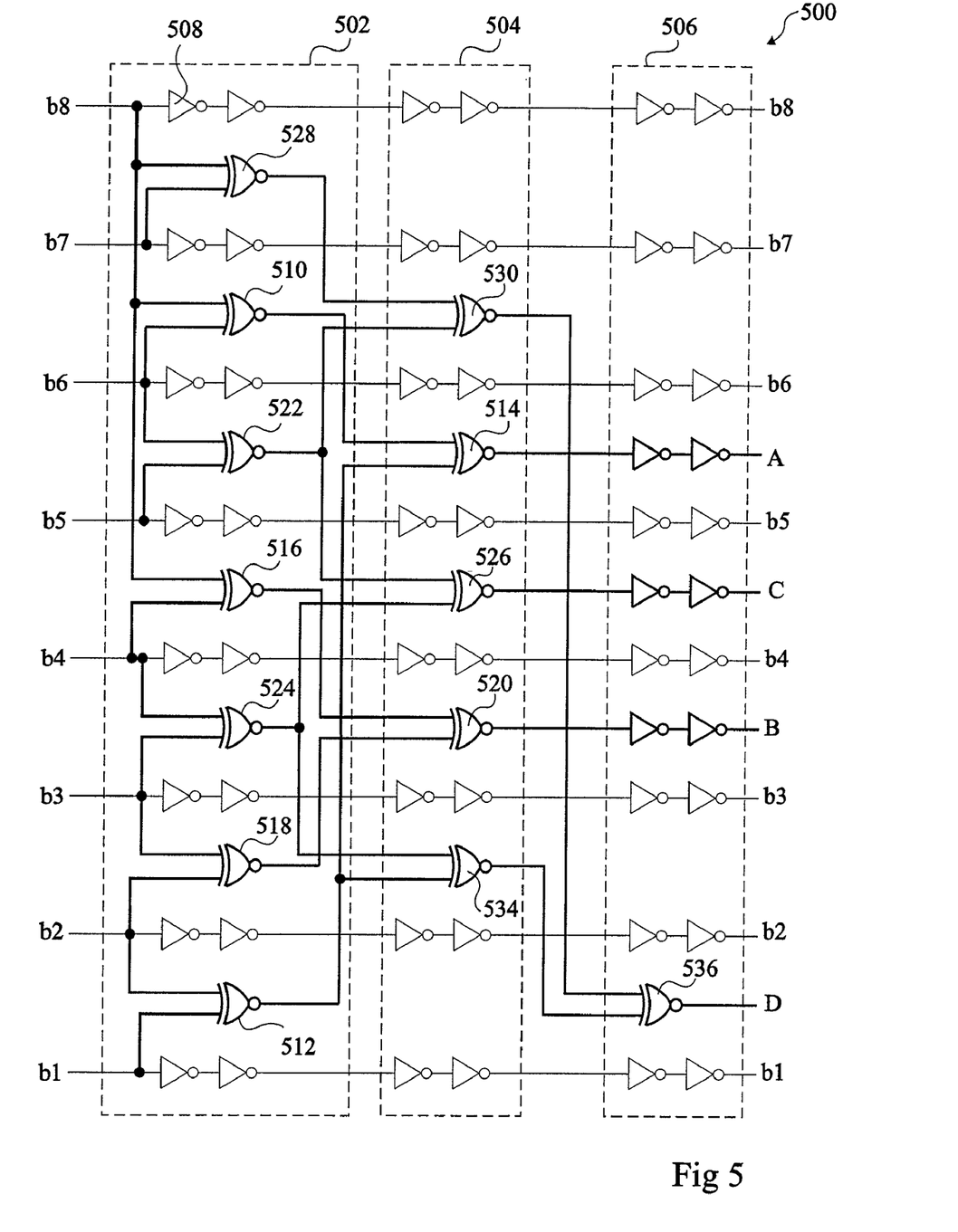
FIG. 5 illustrates an example of a data bus comprising circuitry according to an embodiment of the present invention.

FIG. 5 illustrates an example of a data bus 500 comprising circuitry for generating error correction code provided in parallel with data buffers. This example is based on the Hamming code. The total number of error correction bits according to an example of the Hamming code for each word of data is equal to $\log_2(n)+1$, where "n" is the number of bits in each word. In the example of FIG. 5, there are 8 data bits b1 to b8 in each block of data for which corresponding error correction codes are to be generated. Therefore, four bits of a Hamming code A, B, C and D are generated.

Data bus 500 comprises three buffer logic blocks 502, 504, and 506 connected in series. Depending on the distance to be traversed by a data bus 500, further logic blocks could be provided comprising further buffers. To minimize the number of connections between the buffer logic blocks and the number of buffers, in this case preferably the logic blocks for performing the error correction code generation are provided as the final buffer logic blocks in the data bus.

In this example, each buffer logic block 502, 504 and 506 comprises two inverters 508 connected in series for buffering each of the data bits b1 to b8.

The error correction bit A in this example is calculated as the exclusive OR of bits b8, b6, b2 and b1, bit B as the exclusive OR of bits b8, b4, b3 and b2, bit C as the exclusive OR of bits b6, b5, b4 and b2 and bit D as the exclusive OR of all of the bits.

In this example, error correction bit A is generated by two XOR gates 510 and 512 in buffer logic block 502, and XOR gate 514 in buffer logic block 504. XOR gate 510 provides exclusive OR of bit b8 and bit b6, while XOR gate 512 provides the exclusive OR of bit b2 and bit b1. XOR gate 514 provides the exclusive OR of the outputs of gates 510 and 512. The output of XOR gate 514 is buffered by two inverters connected in series in buffer logic block 506 to provide the output error correction bit A.

In a similar fashion, error correction bit B is calculated based on the exclusive OR of bits b8 and b4 by XOR gate 516 and of bits B3 and B2 by XOR gate 518 in buffer logic block 502, and in buffer logic block 504, the exclusive OR of the outputs of XOR gates 516 and 518 by gate 520. Again the output of XOR gate 520 is buffered by two inverters connected in series in buffer logic block 506.

Error bit C is generated based on the exclusive OR of bits b6 and b5 by XOR gate 522 and of bits b4 and b3 by XOR gate 524 in buffer logic block 502, and the exclusive OR of the outputs of XOR gates 522 and 524 by XOR gate 526 in buffer logic block 504. Two inverters are provided in series in buffer logic block 506 to buffer the output of XOR gate 526.

Error bit D is generated based on an exclusive OR of all of the bits b1 to b8. For this, an XOR gate 528 is provided in buffer logic block 502 for providing the exclusive OR of bits b8 and b7, and XOR gates 530 and 534 are provided in buffer logic block 504 providing the exclusive OR of the outputs of XOR gates 528 and 522, and 524 and 512 respectively. An XOR gate 536 in buffer logic block 506 provides the exclusive OR of the outputs of XOR gates 530 and 534, to provide the output error correction bit D.

This example is based on a parallel data bus. It will be evident that the same principles could be applied to a serial data bus if extra logic is provided in each buffer logic block for converting serial bit streams into a parallel stream for calculation of the error bits. The error bits and any intermediate signals are for example then transmitted on separate parallel lines, or re-introduced into the serial stream at the output of each buffer.

Figure 6:
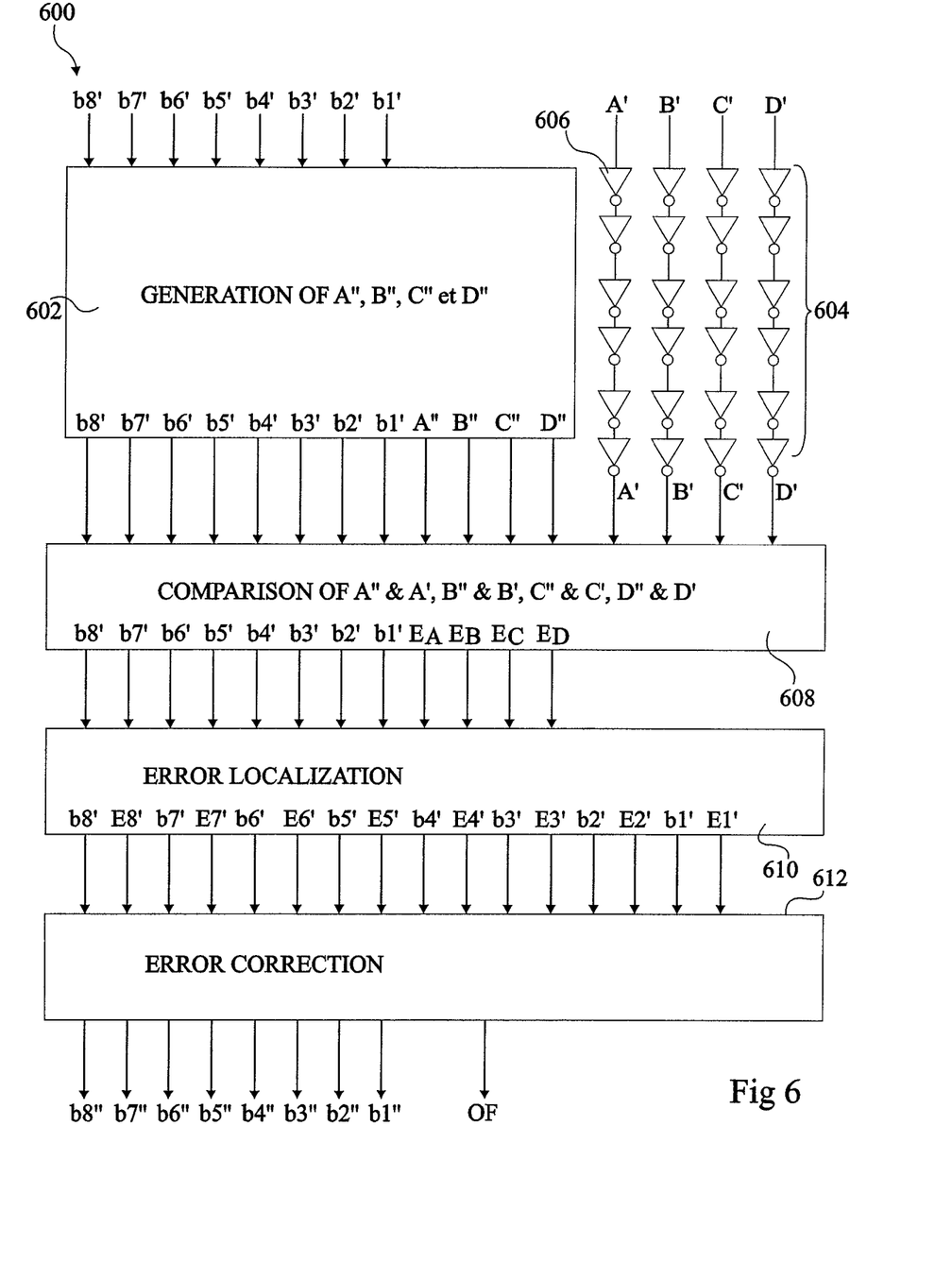
FIG. 6 schematically illustrates an example of a data bus comprising circuitry for generating error correction bits and correcting errors according to an embodiment of the present invention.

FIG. 6 illustrates an example of a data bus 600 comprising circuitry for checking the error correction bits, and correcting one or more errors.

As illustrated in FIG. 6, data bus 600 comprises input lines for receiving bits b1' to b8' and error correction bits A' to D' originating from the error correction code generation circuitry, for example circuit 500 of FIG. 5, but which may contain one or more errors with respect to that data.

Data bus 600 comprises a generation block 602 which regenerates the error correction bits from the data bits b1' to b8', and these are labelled A", B", C" and D". If a data error has occurred, the error correction bits A" to D" may be different from the error correction bits A' to D'. The circuit block 602 has not been illustrated in detail, and is, for example, identical to circuitry 500 illustrated in FIG. 5.

A series of buffer stages 604 comprising inverters 606 connected in series, are provided for buffering the error correction bits A', B', C' and D' previously generated. Although shown as one block for simplicity, as with circuit 500, the circuit block 602 comprises three buffer logic blocks connected in series, and two inverters 606 connected in series relating to each of the data bits A' to D' are for example provided in each buffer logic block.

Buffer logic blocks 608 and 610 are connected in series with block 602, and each comprises buffers for buffering the eight bits b1' to b8'. Buffer logic block 608 also comprises a series of comparators, for example formed of AND gates, for comparing the previously calculated error correction bits with the regenerated error correction bits, in other words A" with A', B" with B', C" with C' and D" with D'. The output of each comparison is provided as an output signal $E_A$, $E_B$, $E_C$ and $E_D$, each indicating whether the comparisons relating to bits A" to D" respectively indicate an error in the data.

In some embodiments only a check for errors is performed, and if any of the values $E_A$ to $E_D$ indicates an error, this is provided as an output so that the associated data can be retransmitted or re-read. However, preferably one or more errors are located and corrected based on this signal, as will now be explained.

The data bits b1' to b8' along with the error indicating bits $E_A$ to $E_D$ are provided to buffer logic block 610, which determines the location of errors in the data based on the signals $E_A$ to $E_D$. In particular, by knowing which error correction bits indicate an error, it is possible according to the Hamming code to localize one or more errors. Thus, in this step, a bit E1 to E8 is generated associated with each data bit b1' to b8'. Each signal E1 to E8 for example has a value of "1" if the associated bit is detected as an error, or a "0" if the associated bit is detected not to have an error.

The data bits b1 to b8, along with the associated error bits E1 to E8, are provided to a subsequent buffer logic block 612 in the series, which comprises circuitry for correcting errors. This block, for example, comprises eight XOR gates, not shown, which form the function of exclusive OR between each bit and its respective error signal. Thus, the output of the correction block 612 is modified data bits b1" to b8", which have been corrected.

An overflow signal OF is also provided at the output of buffer logic block 612, which for example indicates if the number of detected errors is too great to be corrected, for example if more than two data bits have errors. This signal is for example generated by block 610 and provided on a separate line (not shown) to block 612. Depending on the encoding scheme, the correction circuitry may generally cope with a limited number of errors. If too many errors are detected, this can be indicated by an output signal, and the data resent or re-read. In the example of FIG. 6 where eight data bits are provided, if $E_A$ to $E_D$ are all "0", this for example indicates no errors, and the other fifteen combinations of bits ("0001" to "1111") indicate different numbers of errors. Some of these combinations represent correctable errors, while some can not be corrected, as indicated by the overflow. The signal OF can be propagated by further buffers, along with the data.

Figure 7:
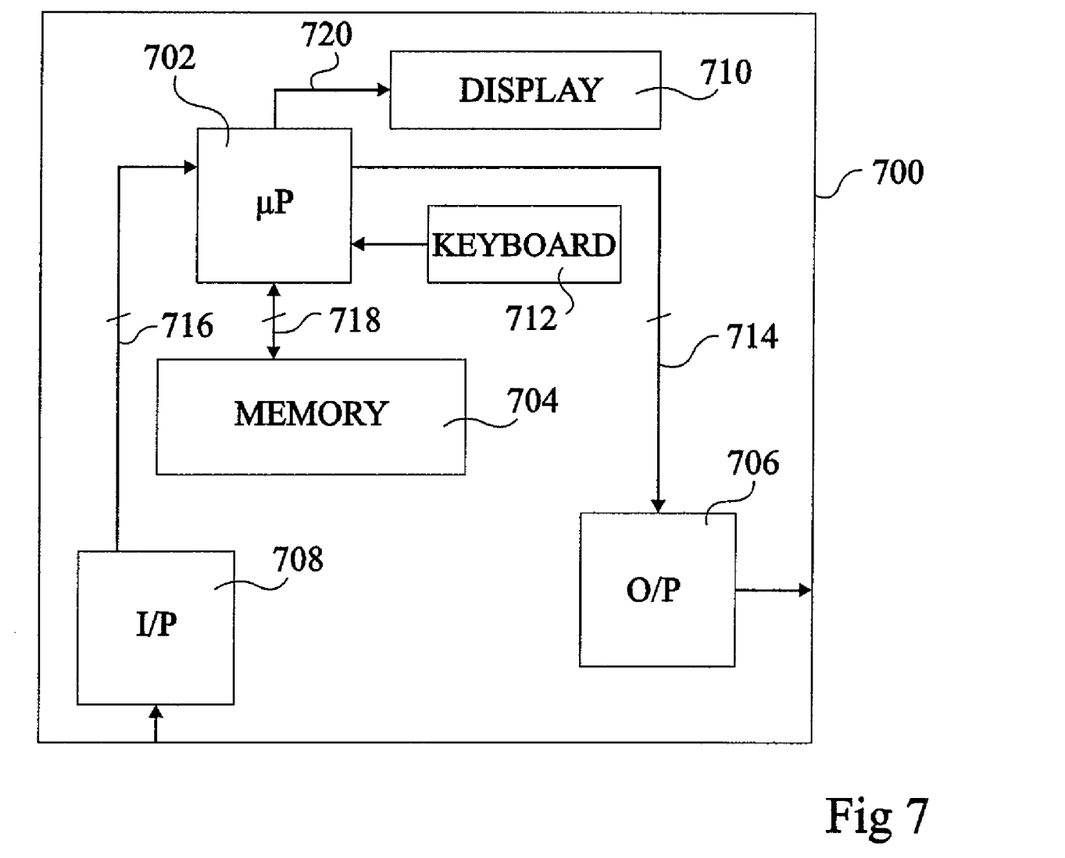
FIG. 7 schematically illustrates a device comprising error correction circuitry according to an embodiment of the present invention.

FIG. 7 schematically illustrates a device 700 which is for example a portable electronics device such as a media player for playing music and/or video, a digital camera, a laptop computer, mobile telephone, personal digital assistant, or other electronic device. Device 700 comprises a microprocessor 702, a memory 704, output port 706, input port 708, display 710, and keyboard or keypad 712. Other components not illustrated in FIG. 7 may also be provided. Data buses are provided between the components. In particular, data buses 714 and 716 are provided to/from the microprocessor 702 to the output and input ports 706, 708 respectively. A bidirectional data bus 718 is provided between the microprocessor 702 and memory 704. A data bus 720 is provided from the microprocessor 702 to the display 710. At least one of data buses 714, 716, 718 and 720 comprises buffer logic blocks with the error correction circuitry as described above.

Advantageously, by combining error correction circuitry with buffers, the logical delays associated with the error correction will be hidden within the buffer blocks, which have an associated propagation delay.

The embodiments of buffer circuitry comprising error correction circuitry described herein can be used in a wide range of applications, not limited to the example of a memory block and a transmission line shown in FIGS. 3 and 4. Such circuitry can be used in general whenever there is a need for error correction coding, either to be generated or to be checked, and/or the data corrected, at the same time as a need for buffers to buffer data.

Examples of devices in which data buses comprising the buffer logic blocks described herein could be incorporated include laptop computers, digital media players such as CD players/writers, DVD players/writers, hard-disk players/recorders, mobile telephones, personal digital assistants, digital cameras etc.

Whilst a number of particular embodiments have been described, it will be apparent to those skilled in the art that there are numerous modifications and alterations that can be applied. For example, while one example of logic for encoding error correction code and one example of logic for checking error correction code has been provided, there are numerous modifications and alterations that can be applied to circuitry.

Furthermore, any error correction coding scheme could be implemented in embodiments of the invention, Hamming code being just one example. Such codes can perform only a check for errors, or correct one, two or more errors.

While in FIGS. 3 and 4 a progressive generation and checking of error correction bits in the series of buffer logic blocks has been illustrated, clearly the error codes can be generated and checked in any fashion, while making use of the multiple buffer stages, and will likely involve generating intermediate signals transmitted from one buffer logic block to the next.

The embodiments described here in could be applied to any number of data bits, and the logic can be implemented in any number of buffer logic blocks, for example ranging from just two buffer logic blocks, to hundreds of buffer logic blocks.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A circuit comprising:
    a first data bus comprising a plurality of first logic blocks coupled in series, each logic block comprising at least one first buffer for buffering at least one data bit transmitted via said data bus and at least some of said first logic blocks further comprising circuitry coupled in parallel with said at least one first buffer and arranged to determine a first bit of error correction code associated with said at least one data bit; and
    a second data bus coupled to said first data bus and comprising a plurality of second logic blocks coupled in series, each second logic block comprising at least one second buffer for buffering at least one data bit transmitted via said second data bus and at least some of said second logic blocks further comprising circuitry coupled in parallel with said at least one second buffer arranged to determine a second bit of error correction code and to compare said first and second bits of error correction code.

2. The circuit according to claim 1, wherein said first bit of error correction code is output by said at least some of said first logic blocks and transmitted with said at least one data bit via said bus.

3. The circuit of claim 1, further comprising a plurality of outputs for outputting said data and said first bit of error correction code.

4. The circuit of claim 1, wherein said at least some of said second logic blocks further comprise logic for correcting said at least one bit of data transmitted by said second data bus based on said comparison.

5. The circuit of claim 1, further comprising a memory circuit coupled between said data buses, said memory circuit arranged to store said at least one data bit and said first bit of error correction code.

6. The circuit of claim 1, further comprising a transmission line coupled between said data buses, said transmission line arranged to transmit said at least one data bit and said first bit of error correction code from said first to said second circuit block.

7. An electronic device comprising the first data bus of claim 1.

8. A media player comprising the electronic device of claim 7.

9. A mobile telephone comprising the electronic device of claim 7.

10. A method of transmitting data via a data bus comprising:

in a first data bus:
buffering at least one bit of said data using at least one first buffer of a first logic block; and
in parallel with the buffering of said at least one bit of said data by said at least one first buffer, determining by said first logic block at least one bit of error correction code associated with said at least one bit of said data; and in a second data bus coupled to said first data bus:
buffering said at least one bit of said data using at least one second buffer of a second logic block; and
in parallel with the buffering of said at least one bit of said data by said at least one second buffer, determining, by said second logic block, a second bit of error correction code and comparing said first and second bits of error correction code.

* * * * *